United States Patent

[11] 3,580,683

| [72] | Inventor | Herbert Schulkind<br>Laurelton, N.Y. |
|---|---|---|
| [21] | Appl. No. | 791,070 |
| [22] | Filed | Jan. 14, 1969 |
| [45] | Patented | May 25, 1971 |
| [73] | Assignee | Photovolt Corporation<br>New York, N.Y. |

[54] COMPUTING COLORIMETER
10 Claims, 2 Drawing Figs.

[52] U.S. Cl. .................................................. 356/184,
356/186, 356/189
[51] Int. Cl. ............................................. G01j 3/48
[50] Field of Search............................................ 356/184,
186, 188, 189, 218, 224—226, 229

[56] References Cited
UNITED STATES PATENTS

| 2,282,741 | 5/1942 | Parker........................... | 356/184 |
|---|---|---|---|
| 2,375,889 | 5/1945 | Benning ....................... | 356/189X |
| 2,436,262 | 2/1948 | Miller............................ | 250/209X |
| 3,459,945 | 8/1969 | Astheimer et al............. | 356/226X |
| 3,076,375 | 2/1963 | Donnell........................ | 356/184X |

Primary Examiner—Ronald L. Wibert
Assistant Examiner—Warren A. Sklar
Attorney—Michael S. Striker ABSTRACT: A colorimeter with a computing circuit by which the concentration of a sample fluid is linearly indicated. Light transmitted through a sample vial of the fluid is directed upon a photosensing device which provides an electrical signal corresponding to the intensity of a transmitted light. The electrical signal from the photosensing device is applied to a computing circuit which transforms the applied electrical signal into one linearly related to the concentration of the fluid under investigation. The output of the computing circuit deflects a current indicating device so that the deflection of this device is proportional to the concentration of the fluid.

COMPUTING COLORIMETER

BACKGROUND OF THE INVENTION

Colorimeters used to determine the concentration of unknown sample fluids have, in the past, been difficult to read and analyze. Thus, the reading of the instrument, of the conventional type, is not linearly related to the concentration of solute within the sample solvent under test or being investigated. As a result of this nonlinear relationship, the operator or user of the instrument must normally record the readings and then calculate the concentration after taking a reading. The necessity of having to stop for the purpose of analyzing the reading, in this manner, causes the colorimeter process to be susceptible to errors, and to make the colorimeter process a slow and tedious operation.

Accordingly, it is an object of the present invention to provide a colorimeter equipped with computing circuitry through which the instrument reading is linearly related to the concentration of the fluid being investigated.

It is another object of the present invention to provide a colorimeter with the aforementioned computing circuitry, so that the colorimeter provides results uneffected by fluctuations of the line voltage used for the operation of the instrument.

It is also an object of the present invention to provide a computing colorimeter in which the results in the form of meter reading linearly related to the concentration of the sample fluid being investigated, and are also independent of thermal effects to which the instrument may be subjected.

It is a specific object of the present invention to provide a constant light intensity source for testing the sample fluid, which is independent of fluctuations in the voltage used to energize the light source.

SUMMARY OF THE INVENTION

The concentration of solute within a solvent of a solution is determined by passing a beam of light directly through the solution. The light transmitted by the solution is directed upon a photosensing device in the form of a photoresistor for the purpose of deriving an electrical signal corresponding to the intensity of a transmitted light through this solution. The photosensing device applies the electrical signal to a computing circuit which computes the logarithmic function of the applied signal. The computing circuit provides an electrical signal which is linearly related to the concentration of the fluid being investigated. The current output of the computing circuit is applied to a microammeter which deflects in accordance with the magnitude of the current. The arrangement is such that the deflection of the microammeter is substantially proportional to the concentration of the fluid under test. For the purpose of accommodating the different fluids, a filter arrangement is provided which may be indexed so that different filters may be selectively inserted into the light path between the photosensor and the vial which contains the fluid under test. Regulated voltage supplies are used to energize the photosensing device and the computing circuit so that consistent results are realized. Adjustments are included to assure proper zero setting of the instrument and for purposes of calibrating the instrument in accordance with a standard known sample fluid.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
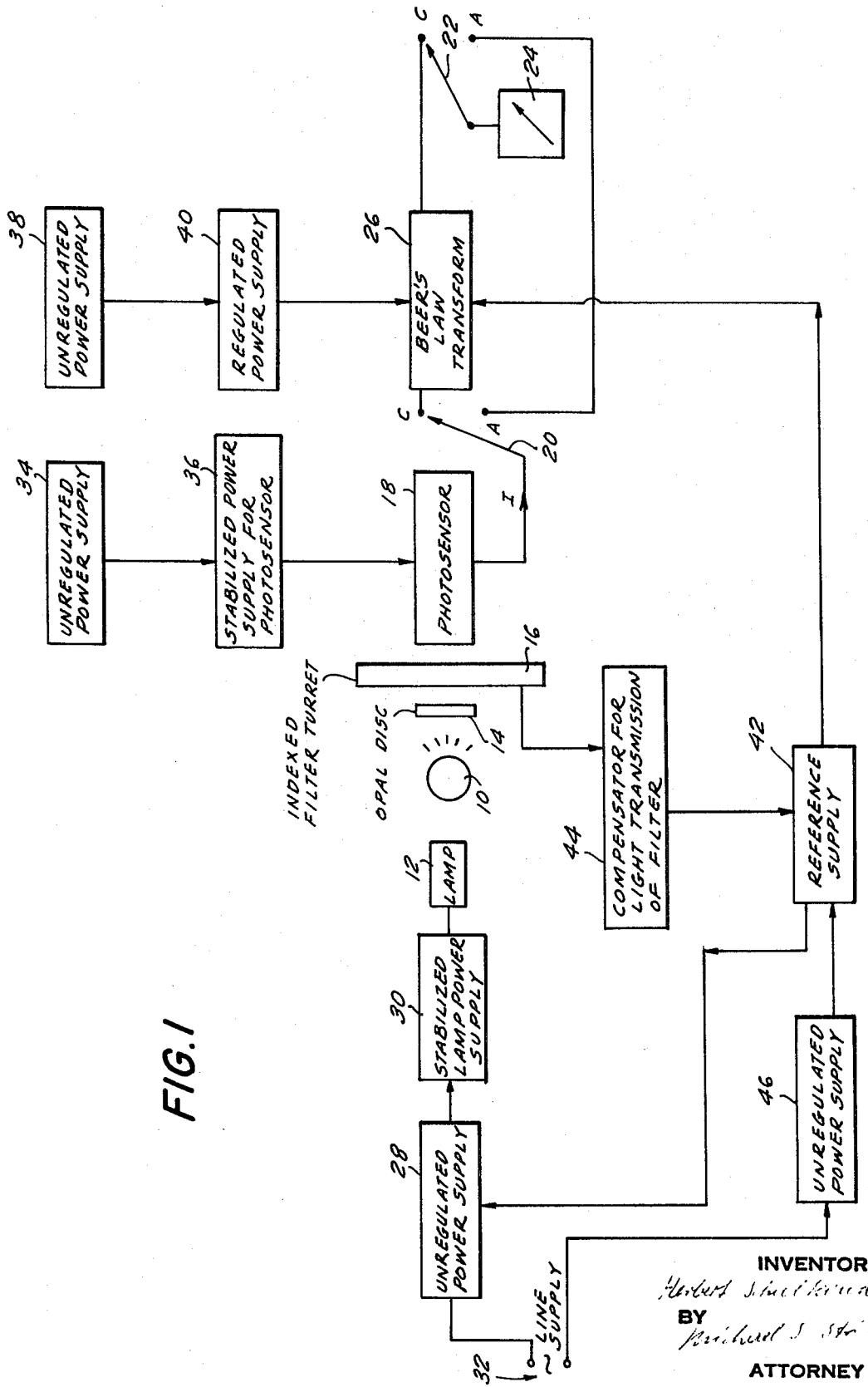
FIG. 1 is a functional schematic diagram and shows the interrelationship of the computing circuits, the photosensing device and the sample fluid being investigated, in accordance with the present invention.
Figure 2:
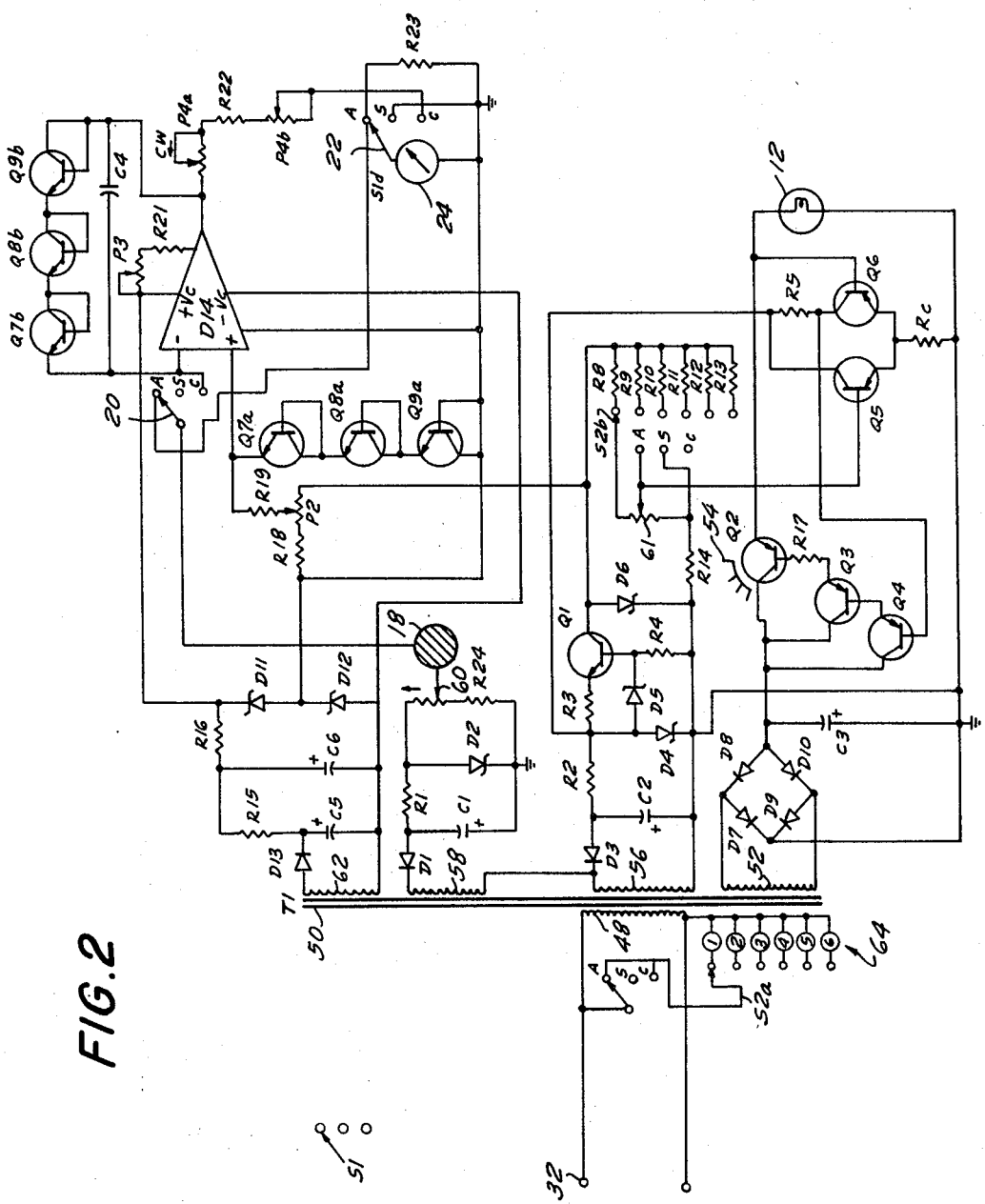
FIG. 2 is an electrical schematic diagram and shows the structural details of the functional blocks of FIG. 1.

Referring to the drawing, a vital or test tube 10 containing fluid, the concentration of which is to be analyzed or determined, is placed between an incandescent lamp 12 and an opal disc 14. The vial 10 is mounted with respect to the lamp 12 so that light emitted by the lamp 12 impinges directly upon the vial and is transmitted therethrough. The vial itself may be in the form of, for example, glass which is transparent to the light emitted by the lamp. The opal disc functions to scatter the light so that an averaging effect of the light transmitted through the vial, is realized. The purpose of this averaging function of the opal disc is to eliminate the effects of fingerprints or scratches which may prevail on the vial.

A turret is provided after the opal disc along the light transmission path. This filter turret is designed to possess a number of different filters which may be used in conjunction with different solutions. Thus, in general, different types of solutions which are to be analyzed with respect to concentration, require different filters. The turret containing the filters, is mounted so that it may be indexed for the purpose of positioning different filters in the path of light transmitted through the vial 10. The indexing of the turret 16 may, for example, be accomplished through the operation of a manually turned knob.

It is the purpose of the different filters to emphasize the parameter or solute which is dissolved in the solvent to be analyzed.

The light transmitted through the filter appropriately selected through rotation of the turret 16, impinges upon a photosensor 18. The photosensor converts the light impinging onto it, into electrical current I which appears at the output of the photosensor. The magnitude of this output current I may be observed or read through a microammeter 24, when the switching poles 20 and 22 are in their positions designated A.

The current I or deflection of the microammeter 24 is a function of the light transmitted through the vial 10. The amount of light transmitted through this vial, on the other hand, is dependent upon the amount of solute in the solvent contained within the vial. Accordingly, the deflection of the microammeter 24 is a function of the solute within the solvent, and hence a function of the concentration of the fluid being analyzed.

When the switches 20 and 22 are in their A positions, so that the output current I from the photosensor 18 is directly applied to the microammeter 24, the deflection of the latter is a nonlinear function of the concentration parameter. As a result each reading must be noted and the answer calculated carefully for the proper results. Procedures of this type are tedious and therefore susceptible to error, since the user or observer must analyze the reading to determine the solute concentration.

To provide simplified operation of the instrument and to permit more rapid analysis of the solutions under test, a transform circuit 26 is provided. This transform circuit is connected for operation within the instrument by transferring the switches 20 and 22 to the positions designated C. In this state of operation, the output current I from the photosensor 18 is applied directly to the transform circuit 26, and the output of this transform circuit leads directly to the microammeter 24.

The function of the transform circuit 26 is to operate on the current I in accordance with Beer's Law. Beer's Law is the logarithmic relationship between absorbance and concentration of the fluid. Thus, the transform circuit 26 computes the logarithm of the value represented by the current I, and thereby deflects linearly the microammeter 24 as a function of the concentration of the fluid under test.

When using the transform circuit 26, therefore, linearization of the readout is obtained, and the user of the instrument is no longer required to record and then calculate the concentration of the sample. The readout of the microammeter may, for example, be in the form of milligrams of solute per 100 millileters of solvent.

To obtain consistent readings in the use of the instrument, in accordance with the present invention, it is essential that the light intensity of the lamp 12 be maintained constant. This is accomplished through the use of the unregulated power supply 28 in conjunction with a stabilizing lamp power supply 30. These two supplies 28 and 30 assure that constant voltage is maintained across the incadescent lamp 12, and independent of fluctuations of the line voltage supply 32. By maintaining the voltage across the lamp 12 constant, in this manner, the intensity of the light emitted by the lamp is correspondingly held constant.

For the purpose of realizing consistent results, moreover, it is also necessary to energize the photosensor 18 with a constant voltage supply. This is accomplished through the power supply components 34 and 36. A constant voltage supply must similarly be applied to the transform circuit 26, if consistent and meaningful results are to be realized. The voltage supply to the transform circuit 26 is realized through the components 38 and 40.

To obtain a zero setting of the instrument through reading of the microammeter 24, a blank solution is held within the vial 10. In such a blank solution, no solute is present. Since the light impinging upon the photosensor 18 after transmission through the vial 10, will depend upon the position of the filter turret 16, a reference supply 42 is provided. This reference supply adjusts the voltage applied to the lamp 12, as well as to the transform circuit 26, as a function of the specific filter being located within the path of the light through the vial. Such adjustment of the voltage is automatically made through the provision of the compensating circuit 44. Depending upon the rotation of the turret 16, and hence the filter being used in the instrument, this position of the turret is conveyed to the compensating circuit 44, in an automatic manner, and the reference supply is adjusted through this compensating circuit 44. Accordingly, the reference supply 42 is automatically adjusted as a function of the position of the turret 16, and thereby the filter is positioned within the path of the light through the vial 10.

When setting the instrument to zero reading, therefore, such zero reading may be accurately and consistently realized for any filter which may be used during such setting. The reference supply 42 is obtained from the line voltage supply 32 through the power supply 46.

To obtain the power supplies for the operation of the colorimeter, in accordance with the present invention, an alternating current line supply is applied to the primary winding 48 of a transformer 50. One secondary winding 52 on the transformer 50 has connected across it a rectifying bridge consisting of diodes D7, D8, D9 and D10. This rectifying bridge converts the AC voltage on the primary into a DC supply. A smoothing capacitor C3 is connected between the bridge output and ground for the purpose of providing a smooth DC signal. This resulting DC signal is then applied to a series pass transistor circuit consisting of transistors Q2, Q3 and Q4 for the purpose of regulating the current flow to the lamp. The latter requires a substantial amount of current which, in a practical instrument, may be of the order of 2½ amperes, and accordingly provision must be included within the instrument to dissipate the heat resulting from such current flow through the series pass transistor circuit. This is accomplished through the heat radiating and dissipating member 54 associated with the series pass transistor circuit. This heat radiating and dissipating member may be in the form of a metallic plate, for example, with radiating fins attached. The good conductivity of this metal structure in combination with the large exposure surface afforded by the fins, makes such a structure a satisfactory heat radiator for this purpose. In this series pass transistor circuit, the collectors of the transistors Q2, Q3 and Q4 are joined together and connected to the output of the bridge circuit and smoothing capacitor. The base of the transistor Q2 is connected to the emitter of the transistor Q3, by way of a resistor R17. The base of the transistor Q3 is, furthermore, connected to the emitter of the transistor Q4. Through this interconnection of the base and emitters of the three transistors, the series pass circuit is realized. The emitter of the transistor Q2 is connected directly to the lamp 12 which is of the conventional incandescent type. The transistors Q5 and Q6 form a comparison circuit which compares the voltage applied to the lamp 12 with the reference voltage provided by the reference supply 42. This comparator circuit of transistors Q5 and Q6, furthermore, regulates the current to the lamp 12 so that the current to the bulb or lamp 12 is made independent of fluctuations of the line voltage supply 32. The comparator circuit is formed by connecting the emitters of the two transistors Q5 and Q6 together and providing a common emitter resistor $R_e$ leading to ground potential. A collector resistor R5 is connected in series with the collector of the transistor Q6. The terminal of the resistor R5 not joined to the collector of the transistor Q6, is connected to the collector of the transistor Q5. The base of the transistor Q6 is directly connected to the lamp 12. The junction of the resistor R5 and the collector of the transistor Q5 leads directly to the reference supply voltage 42. The comparator circuit is thus interconnected so as to compare the lamp voltage with the voltage of the reference supply, and to regulate the lamp current in response thereto.

The reference supply 42 is obtained from an unregulated power supply which includes another secondary winding 56 on the transformer 50, a diode or rectifier D3, and a smoothing capacitor C2. This unregulated power supply is a half-wave rectifying circuit, and as a result the ripple output of this unregulated supply is high. The magnitude of the ripple, however, is diminished through further circuitry connected to this unregulated supply 46. The reference supply connected to this unregulated supply 46 includes the resistor R2, Zener diode D4 and D5, resistor R4, transistor Q1 and resistor R3, and Zener diode D6. The resistors R2 and R3 form a series circuit which is connected between the emitter of the transistor Q1 and the output of the unregulated supply 46. The Zener diode D5 is connected between the base of the transistor Q1 and the junction of the resistors R2 and R3. The resistor R4 is connected between the base of the transistor Q1 and ground potential. The Zener diode D4 lies between the junction of the resistors R2 and R3, and ground potential. The Zener diode D6, on the other hand, lies in parallel with the collector-base circuit of the transistor Q1 by being connected between the collector of this transistor and ground potential. The resistor R2 and Zener diode D4 form a Zener regulated supply in the form of a coarse preregulator with a positive temperature coefficient. This preregulator supply, in turn, supplies power to the constant current circuit consisting of the resistor R3, diode D5, resistor R4 and transistor Q1. The constant current which results therefrom, is applied to a temperature stabilized Zener diode D6. Through proper selection of the components involved in this circuit, overall temperature stability may be realized, so that a 10° centigrade rise in temperature will not result in more than 0.1 percent voltage change across the diode D6. For the purpose of prolonging the operating life of the selective components, the components should be operated well below their rated values.

The reference voltage supply provides a comparison voltage for the incandescent lamp 12, as well as a reference source for the Beer's Law transformation circuit 26. These reference voltages are used in a manner which adds to the stability of the instrument. The operation is such that a rise of voltage across the incandescent lamp becomes compensated through a rise in voltage applied to the comparison circuit associated with the computing section of the instrument in accordance with the present invention.

The unregulated power supply 34 for the photosensor 18 includes the diode D1 and the capacitor C1. This constitutes a half-wave rectifying circuit with a large ripple output, but this ripple is smoothed through further circuitry connected to this unregulated power supply. The stabilizing power supply 36 for the photosensor includes the resistor R1 and Zener diode D2.

The diode D1 in the unregulated supply 34 is connected to the output of the additional secondary winding 58 on the transformer 50. The capacitor C1 is connected directly to the output or other terminal of the diode D1, and leads to ground potential. The resistor R1 is connected between the Zener diode D2 and the junction of the diode D1 and the capacitor C1. The output of the stabilized supply 36 as represented by the junction of the resistor R1 and Zener diode D2, is applied to a voltage divider in the form of a potentiometer 60.

The remaining power supply for the transformation circuit 26 is derived from the secondary winding 62, the rectifying diode D13, and the smoothing circuit consisting of the resistor R15 and the capacitor 5. The resulting half-wave rectified voltage from this unregulated supply 38 becomes smooth in the further regulated supply 40. In this unregulated supply 38, the diode D13 is connected between the secondary winding 62 and the capacitor C5. The resistor R15 is joined to the junction of the diode D13 and capacitor C5.

The regulated supply 40 includes the capacitor C6, resistor R16, and Zener diodes D11 and D12. The capacitor C6 is connected directly across the output of the unregulated supply 38, by being in parallel with the resistor R15 and the capacitor C5. The resistor R16 is connected to the junction of the capacitor C6 and the resistor R15. The Zener diodes D11 and D12 are connected in series and serve to further smooth and regulate the supply as derived from the circuit 38. The series combination of the Zener diodes D11 and D12 provides a regulated split voltage for use in the computing circuitry of the transformation circuit 26.

The computing circuit for performing Beer's Law transformation, is synthesized from an operational amplifier D14 and the dual mounted transistors Q7a, Q8a, Q9a, Q7b, Q8b and Q9b. Thus, the transistors Q7a and Q7b are thermally matched and mounted together. This same structural feature applies to the transistors Q8a and Q8b, as well as Q9a and Q9b. The transistors Q7b, Q8b and Q9b form a series combination connected between the output and input of the operational amplifier D14. Through the application of this series combination in conjunction with the operational amplifier D14, the logarithm of the signal derived from the photosensor 18, is computed. The arrangement is such that the emitter of the transistor Q7b is connected to the input of the amplifier D14, whereas the base of the transistor Q7b is connected to both the collector of the transistor Q7b as well as the emitter of the transistor Q8b. The base of the latter is, in turn, connected to both the base of transistor Q8b and the emitter of transistor Q9b. The base and collector of the latter are joined together and connected to the output of the amplifier D14. A capacitor C4 is connected across the output and input of the amplifier D14, and thereby in parallel with the series combination of transistors Q7b, Q8b and Q9b. The resistor R21 and potentiometer P3 are trimming components which serve to trim the functional operation of the amplifier D14 in the conventional manner.

The transistors Q7a, Q8a, and Q9a form a series combination which serves to compensate for thermal effects which may effect the results in an undesirable manner. Thus, the emitter of transistor Q7a is connected directly to the other input of the amplifier D14, whereas the base of the transistor Q7a is joined to its collector and the emitter of the transistor Q8a. In a similar manner, the base of transistor Q8a is connected to its own collector and the emitter of the transistor Q9a. The chain of this transistor series circuit is completed by connecting the base of the transistor Q9a to its own collector and to ground potential. The junction of the resistor R16 and Zener diode D11 is connected to the operational amplifier D14, by way of the trimming potentiometer P3 and resistor R21. In this manner, a regulated and stabilized power supply is applied to the amplifier. The output of the amplifier and hence of the Beer's Law transformation circuit 26, is applied to the microammeter 24, by way of the switch 22. In this mode of operation, the switch 22 is in the C position. The switching pole 22 is part of a multipolar in multiposition switch which also includes the switching pole 20. Thus, when the switching pole 22 is transferred to the C position, the switching pole 20 is simultaneously transferred to this operating position C. The switching pole 22 may be considered as one deck of a multideck switch which makes possible multipolar and multiposition operation. A manually operated knob may, for example, be provided to move the poles 20 and 22 simultaneously between their operating positions. Accordingly, when the microammeter is connected to the output of the transform circuit 26, and thus to the output of the amplifier D14, the switching pole 20 is also in the C position. In this position of the switching pole 20, it is noted that the signal output of the photosensor 18 is directly applied to the input of the amplifier D14. Potentiometers P4a and P4b are provided for purposes of applying coarse and fine adjustments, respectively, in calibrating the instrument. Thus, when performing a calibration operation, a known sample is used in the instrument, and the microammeter 24 is read. The coarse adjustment P4a and the fine adjustment P4b are then manipulated so that the microammeter 24 reads the proper and known quantity corresponding to the known sample fluid.

For purposes of calibrating the instrument, two points on the instrument are required. One of these points is the zero setting of the microammeter 24, whereas the second point corresponds to the reading of a known sample. When setting the instrument for zero reading, a blank solution is used in conjunction with the photosensor 18 as previously described. In the zero setting operation the switches 20 and 22 are in their C position. As a result, the signal output of the photosensor 18 is applied to the Beer's Law transformation circuit 26. The potentiometers 60 and 61 are then adjusted in their settings so that the microammeter reads zero. In this manner, the zero setting of the instrument is realized. The potentiometers 60 and 61 represent fine and coarse adjustments, respectively. Through the adjustment in the settings of these two potentiometers, the signal output from the photosensor may be adjusted, and the reading of the microammeter 24 may thereby be correspondingly varied. Once the zero setting of the instrument has been obtained, a known sample with known solute in a given quantity of solvent is used in the instrument, and the microammeter is read. The potentiometers P4a and P4b are then adjusted in their settings so that the microammeter reads the proper value which corresponds to the known concentration of the sample.

The resistors R8 to R13 inclusively serve to compensate for the different effects of the different filters in the turret 16 when zero setting the instrument. Thus, through angular rotation of the turret 16, the applicable resistor of the compensating circuit 44 is applied to the reference circuit, so that the zero setting may be realized independent of the position of the turret or particular filter being used. Thus, the selection of the particular resistor R8 to R13 within the compensating circuit 44 is automatically accomplished through the rotation of the turret 16 which determines the particular filter being used in the instrument.

Neon lamps 64 are provided to indicate the instrument which filter lies within the light path to the photosensor. Thus, simultaneously with the selection of one of the resistors R8 to R13 within the compensating circuit 44, one of the lamps of the bank of lamps 64 is correspondingly selected. The selection is performed through a selector switch S2 of which the deck S2a selects the neon lamp, whereas the deck S2b selects the appropriate resistor. In this manner, the position of the turret is automatically indicated to the user of the instrument, so that no special effort is required to determine which filter is being used.

The instrument has a standby position in which the switches 20 and 22 are transferred to the switching position designated by S. In this standby mode of operation, the electronic circuitry within the instrument is maintained warm and ready for operation when called upon. In this standby mode of operation, furthermore, microammeter 24 is short-circuited so that it may be readily transported. Thus, any vibration or shock imparted to the instrument while in the course of being transported, are dampened out through the short-circuiting of the microammeter, and as a result the latter does not experience the undesirable vibrations which may result in damage to this sensitive instrument.

The Beer's Law transformation circuit 26 transfers the current from the photosensor 18 which may be in the form of a photoresistor, into current which is directly proportional to the concentration of the sample fluid under test. Through the use of this transformation circuit, the concentration of the sample is read directly on the meter 24 in concentration units. The circuit functions as a logarithmic operational amplifier transfer function generator, where the input current is derived from a photosensor in the form of a photoresistor. Thermal problems are minimized by maintaining the instrument in the "on" state and by using dual transistors in the feed back path and the comparison circuit of this differential amplifier. The currents through the transistor are automatically matched when the operator or user of the instrument sets the instrument to zero concentration using the adjustment potentiometer 60 and 61 and P2. The transistors are in one tightly coupled thermal package, and drift is thereby reduced to a negligible value.

It will be understood that each of the elements described above, or two or more together, may also find a useful application in other types of constructions differing from the types described above.

While the invention has been illustrated and described as embodied in computing colorimeters, it is not intended to be limited to the details shown, since various modifications and structural changes may be made without departing in any way from the spirit of the present invention.

What I claim as new and desired to be protected by Letters Patent is set forth in the appended claims.

1. A colorimeter for determining the concentration of solute within a solvent of a solution, comprising, in combination, a sample containing region; a light source for directing a beam of light along a predetermined light path through said region; a photosensor in said path and receiving light from said source after transmission through said region, said photosensor providing an electric signal corresponding to the intensity of light incident upon said photosensor; color filter means positioned in the path of said beam of light between said light source and said photosensor; a Beer's law transform circuit, said circuit including an operational amplifier having an inverting input connected to the output of said photosensor, a noninverting input, an output, and a feedback circuit for providing the Beer's law transform connected between said inverting input and said operational amplifier output, said feedback circuit including at least one first transistor connected to provide an electron path from said inverting input to said operational amplifier output, said first transistor having first and second main electrodes and a control electrode, said first and second electrodes being respectively connected to said inverting input and to said operational amplifier output, and said control electrode being connected to one of said first and second electrodes, whereby the logarithmically related signals received from said photosensor are converted by said Beer's law transform circuit into electric signals linearly related to the concentration of solute; said transform circuit further including a first comparator circuit having at least one second transistor connected to provide an electron path between said noninverting input and ground, said second transistor having first and second main electrodes and a control electrode, said first and second electrodes being respectively connected to said noninverting input and to ground and said control electrode being connected to one of said first and second electrodes; a source of reference voltage connected to said noninverting input; and indicating means connected to said operational amplifier output, whereby the indications of said indicating means are linearly proportional to the concentration variations of the solute.

2. A colorimeter as defined in claim 1, wherein said first and second transistors are positioned so as to comprise a pair at substantially the same temperature.

3. A colorimeter as defined in claim 1, wherein said color filter means has a plurality of color filters, and further including a current source for said light source; and a second comparator circuit connected to said current source and to said source of reference voltage for controlling the latter to cause the voltage supplied to said light source and to said noninverting input to vary in dependence on which one of said color filters is in the path of said beam of light, so that zero setting of the colorimeter is independent of the color filter used.

4. A colorimeter as defined in claim 3, further including a direct current source, and wherein said direct current source includes at least two series connected first and second transistors forming a series path circuit, the collectors of said series connected first and second transistors being connected to the output of said direct current source, the emitter of said first transistor being connected to the base of said second transistor and the emitter of said second transistor being connected to said output of the direct current source.

5. A colorimeter as defined in claim 4, further including a source of coarse preregulated voltage, the output of said source of coarse preregulated voltage being connected to the input of said source of reference voltage; as many resistors as there are said color filters connected to one side of the output of said source of reference voltage, and wherein said second comparator circuit comprises first and second transistors, a common resistor connecting the emitters thereof to one side of said light source, the base of said second transistor being connected to the other side of said light source, the collector of said second transistor of said second comparator circuit being connected to the base of said first transistor of said current source, a resistor connecting together the collectors of said first and second transistors of said second comparator circuit and also connecting the collector of said second transistor to the output of said source of preregulated voltage; and a switch having a movable contact for connecting the base of said first transistor of said second comparator circuit in turn to each of said resistors connected to said one side of the output of said source of reference voltage for enabling, in dependence on the filter in said path of the light beam, variation of the voltage furnished to said noninverting input by said source of reference voltage.

6. A colorimeter as defined in claim 5, including a potentiometer connected between the other side of said output of the source of reference voltage and said movable contact of said switch, and a wiper comprised by said potentiometer connected to said base of said first transistor of said second comparator circuit.

7. A colorimeter as defined in claim 2, including the same number, greater than one, of first and second transistors, said first transistors and said second transistors respectively being directly coupled in series, corresponding ones of said first and second transistors being positioned so as to comprise pairs at substantially the same temperature, and the control electrode of each of said first transistors being connected to a main electrode of the respective first transistor and the control electrode of each of said second transistors being connected to a main electrode of the respective second transistor.

8. A colorimeter as defined in claim 1, further including a current source for said light source; and a second comparator circuit for comparing the voltage across said light source with said reference voltage to regulate said current source.

9. A colorimeter as defined in claim 8, further including a direct current source, and wherein said current source includes at least two series connected first and second transistors forming a series path circuit, the collectors of said first and second transistors being connected to the output of said direct current source, the emitter of said first transistor being connected to the base of said second transistor and the emitter of said second transistor being connected to said output of the direct current source.

10. A colorimeter as defined in claim 9, wherein said color filter means has a plurality of color filters, and further including a source of coarse preregulated voltage, the output of said source of coarse preregulated voltage being connected to the input of said source of reference voltage; as many resistors as there are said color filters connected to one side of the output of said source of reference voltage, and wherein said second comparator circuit comprises first and second transistors, a common resistor connecting the emitters thereof to one side of said light source, the base of said second transistor being connected to the other side of said light source, the collector of said second transistor of said comparator circuit being connected to the base of said first transistor of said current source, a resistor connecting together the collectors of said first and second transistors of said comparator circuit and also connecting the collector of said second transistor of said comparator circuit to the output of said source of preregulated voltage; and a switch having a movable contact for connecting the base of said first transistor of said comparator circuit in turn to each of said resistors connected to said one side of the output of said source of reference voltage for enabling, in dependence on the filter in said path of the light beam, variation of the output voltage of said source of reference voltage.